(12) United States Patent
Ghouti et al.

(10) Patent No.: US 8,184,803 B2
(45) Date of Patent: May 22, 2012

(54) HASH FUNCTIONS USING ELLIPTIC CURVE CRYPTOGRAPHY

(75) Inventors: Lahouari Ghouti, Dhahran (SA); Mohammad K. Ibrahim, Leicester (GB); Atef J. Al-Najjar, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 794 days.

(21) Appl. No.: 12/318,406

(22) Filed: Dec. 29, 2008

(65) Prior Publication Data
US 2010/0166174 A1 Jul. 1, 2010

(51) Int. Cl.
*H04L 29/06* (2006.01)
(52) U.S. Cl. ............ 380/28; 380/29; 708/200; 708/490; 708/492; 713/168; 713/170; 713/181
(58) Field of Classification Search .................... 380/28, 380/29; 708/200, 490, 492; 713/168, 170, 713/181
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 6,307,935 B1 * | 10/2001 | Crandall et al. | ............... 380/28 |
| 6,424,712 B2 | 7/2002 | Vanstone et al. | |
| 6,816,594 B1 | 11/2004 | Okeya | |
| 7,382,876 B2 * | 6/2008 | Lauter et al. | ..................... 380/28 |
| 7,587,605 B1 * | 9/2009 | Venkatesan et al. | .......... 713/180 |
| 7,856,101 B2 * | 12/2010 | Al-Gahtani et al. | ............ 380/30 |
| 7,961,873 B2 * | 6/2011 | Ibrahim | .......................... 380/28 |
| 7,961,874 B2 * | 6/2011 | Ibrahim | .......................... 380/28 |
| 2003/0059042 A1 | 3/2003 | Okeya et al. | |
| 2003/0072443 A1 | 4/2003 | Harley et al. | |
| 2003/0123656 A1 | 7/2003 | Izu et al. | |
| 2003/0142820 A1 | 7/2003 | Futa et al. | |
| 2005/0018851 A1 * | 1/2005 | Venkatesan et al. | .......... 380/277 |
| 2010/0111296 A1 * | 5/2010 | Brown et al. | .................... 380/28 |
| 2010/0166174 A1 * | 7/2010 | Ghouti et al. | ................... 380/28 |
| 2010/0166175 A1 * | 7/2010 | Ghouti et al. | ................... 380/28 |
| 2010/0166176 A1 * | 7/2010 | Ghouti et al. | ................... 380/29 |
| 2010/0169658 A1 * | 7/2010 | Ghouti et al. | .................. 713/181 |
| 2010/0177890 A1 * | 7/2010 | Ghouti et al. | ................... 380/30 |
| 2011/0200186 A1 * | 8/2011 | Ghouti et al. | ................... 380/43 |

FOREIGN PATENT DOCUMENTS

| | | |
|---|---|---|
| EP | 0874307 | 10/1998 |
| EP | 0892520 | 1/1999 |
| EP | 1215642 | 6/2002 |

\* cited by examiner

*Primary Examiner* — Nathan Flynn
*Assistant Examiner* — Sarah Su
(74) *Attorney, Agent, or Firm* — Richard C. Litman

(57) ABSTRACT

The hash functions using elliptic curve cryptography are hash functions that are produced using both an elliptic curve and a twist of the elliptic curve. Hash points are assigned values that either correspond to points on the elliptic curve or to points on the twist, depending upon whether the scalar value of the corresponding message block produces a quadratic residue or a quadratic non-residue when substituted as the x-value into the elliptic curve equation. The corresponding hash point x-coordinates are concatenated to form the hash bit string. The hash points may be doubled, and the hash functions may be applied to multimedia data by applying a media compression method to the message data before computing the hash points.

12 Claims, No Drawings

HASH FUNCTIONS USING ELLIPTIC CURVE CRYPTOGRAPHY

BACKGROUND OF THE INVENTION

1. Field of the Invention

The present invention relates to cryptographic methods used in electronic communications, particularly over a computer network, and more particularly to hash functions using elliptic curve cryptography for digital signatures, authentication, and other applications where hash functions are appropriate.

2. Description of the Related Art

"One-way" hash functions are cryptographic constructs used in numerous cryptographic applications. One-way hash functions are typically used with public-key algorithms for both encryption and the formation of digital signatures. These hash functions may also be used in the fields of integrity checking, authentication, and in numerous other fields.

Hash functions receive a block of data as input, and produce a "hash" or "message digest" as output. Typically, the hash acts as a signature for the original data without revealing its contents. Thus, it is important that the hash function be irreversible, i.e., not only should it be nearly impossible to retrieve the original data, but it must also be impossible to construct a data block that matches some given hash value.

Randomness, which is typically a cornerstone in cryptographic algorithms, is not typically included in hash functions, which tend to be completely deterministic in nature. Given the exact same input twice, a proper hash function should always produce the same output. Even a single bit changed in the input should produce a different hash value. Ideally, the hash value should be small enough to be manageable in further manipulations, yet large enough to prevent an attacker from randomly finding a block of data that produces the same hash.

Hash functions are not used directly for encryption, but are often very useful for authentication. One of the simplest, and most common, uses of hash functions is to protect passwords. UNIX systems, in particular, apply a hash function to a user's password and store the hash value, rather than storing the password itself. In order to authenticate the user, a password is requested, and the response runs through the hash function. If the resulting hash value is the same as the stored value, then the user must have supplied the correct password and is authenticated. Since the hash function is irreversible, obtaining the hash values does not reveal the passwords to an attacker.

As noted above, another common application of hash functions is in the formation of digital signatures. Because asymmetric cryptographic algorithms are relatively slow and can only encrypt blocks smaller than their key size, when computing digital signatures it is common to sign a cryptographically strong message digest rather than the whole message. Such message digests are obtained by applying a secure hash function. Signing just the message digest is equally valid as signing the entire message due to the particular properties of hash functions, which are described in greater detail below.

Hash functions may further be used to generate data signatures when both the sender and recipient of a data message share a secret value. By combining the data message with the secret value, and running the message through a hash function, a signature is generated in the form of the hash value. The data message is then transmitted along with the signature. The recipient then combines the received message with the secret value, generates a hash value, and checks to make sure the value is identical to the signature, thus verifying the authenticity of the message.

From the above, it is obvious that hash functions must exhibit strong security properties in order to ensure that they do not degrade the security of the whole system of which they are part. A hash is typically viewed simply as an encoded value H(m), representing the integrity of a value m. A hashing algorithm takes a string of bits as input and converts the string into a smaller string of bits, called the "hash value". Since the input space is greater than the output space, there exists the possibility that two or more elements of the input space map to one element of the output space. The uniform distribution property minimizes such collisions, i.e., the number of collisions or corresponding m values for each hash value H(m) should be equal. Hash functions are used because they are essentially collision-free, thus making it virtually impossible to find two messages that hash to the same hash value.

Thus, hash functions must be cryptographically secure, meaning that they exhibit the following properties. First, the hash functions follow one-way or "pre-image" resistance, i.e., for a given hash code h, it is impossible to find an m where H(m)=h. This is considered one-way, because it is impractical to determine what input corresponds to a given output. One-way functions imply that it is relatively easy to take a message and compute the hash value, but that it is a relatively computationally difficult problem to take a hash value and re-create the original message. In other words, it is computationally infeasible to find a message that has a given message digest.

Second, hash functions exhibit "weak collision" or "second pre-image" resistance, i.e., it is relatively computationally difficult to find two messages that have the same message digest. Given this, it is then impossible to find, given a message, another message with the same message digest, i.e., the message digest is a good replacement for the message for the purposes of digital signature computation. Thus, hash functions should have uniform distribution.

Third, hash functions exhibit "strong collision" resistance, i.e., it is infeasible to find a pair $(m_1, m_2)$ so that $H(m_1)=H(m_2)$. This implies that similar hash keys should be hashed to very different hash results. Ideally, a single bit change in the hash key should influence all bits of the hash result.

Current hash functions produce a message digest of fixed length n for a message of arbitrary length. When using a good hash function, in the sense of its output appearing random, the only way to break the hash is by testing a large number of messages. To find a message with a given message digest, one will have to try approximately $2^n$ messages, or $2^{n/2}$ messages, to find two messages with the same message digest. It is presently considered to be possible to search $2^{32}$ messages with today's technology, but not $2^{64}$. Thus, n=128 is chosen for current hash functions.

Of presently existing hash functions, one set of widely used dedicated hash functions are the MDx hash functions, which were initially developed as a set of dedicated hash functions called MD4. Subsequent to that, a group of dedicated hash functions were created that were all based on similar design ideas to MD4. Several other algorithms have been derived from MD4 (with improved strength), which are typically referred to as the MDx-class. Included in the MDx-class are the MD5 algorithm, the SHA algorithms, and the RIPEMD algorithms. These hash functions are the most popular in present use, due to their performance and due to the trust gained from cryptanalytic efforts.

The design principles of the hash functions of the MDx-class are sequential and iterated constructions, where the hashing is based on the iteration of a compression function, taking a chaining variable and a message block as inputs and producing a new value for the chaining variable as output. The lengths of the chaining variable and the hash result are equal (c=n bits). Further, the hash result is taken as the final value of the chaining variable, obtained after the last application of the compression function. Thus, there is no output transformation. An initial value is defined for the chaining variable, and the message to be hashed is first preprocessed by adding some padding bits and dividing it in blocks of equal length (b bits).

The algorithms in the MDx class of algorithms include the following properties. The algorithms allow for message pre-processing, a message expansion procedure, the length of the message bit string, the message block size and, thus, the number of message words and word length, the number of chaining variables, the number of sequential steps, the number of rounds, the Boolean functions used in each round, additive constants, sub-word rotation of one or more of the chaining variables, shuffling of the chaining variables, and shuffling of the message words at each step and round.

The elaborate structure of the MDx class of hash algorithms is used in order for the resultant algorithm to be collision resistant. In general terms, MDx class algorithms resemble block ciphers, operating on a fixed initial value, with the message being hashed, thus providing the subkeys for the block cipher's operation. However, the algorithms accomplish more than just this, and must do so, because it is trivial with DES, for example, to produce any desired value for the final output by varying the last two subkeys. Thus, collisions may be produced essentially at will for a hash function that operates in this manner.

The above weakness of the MDx family is well known, with the main problem of the MDx class of hash functions appearing to be that they are not based on a computationally difficult problem that is collision resistant.

Hash functions based on block ciphers are also well known. In order to compute a hash for a relatively very short message, a symmetric cryptographic algorithm, such as DES, can be used. UNIX uses this algorithm to verify passwords in the following manner. The first eight characters of the password in seven-bit ASCII form a 56-bit DES key used to encrypt the number zero. DES's output is the hash, and in order to verify a password, this hash is compared to the one stored in the system's password database. Hashes of larger messages may also be computed with symmetric cryptography, but this is rare.

Since some block ciphers, including DES, are very secure against someone determining the key, even when the plaintext as well as the ciphertext is known, using a document as the key to a block cipher, like DES, rather than as the plaintext input, may allow the ciphertext output to function as a secure hash.

This type of approach, but used with specially constructed block algorithms that operate on larger blocks, and with the text being hashed used as a source of subkeys rather than keys from which keys for multiple rounds are derived, is a common method of performing secure hash functions. The security of the hash function based on block ciphers is dependent upon the security of the underlying block ciphers.

The security of encrypting a sequence of message blocks using a block cipher depends on two aspects: the security of the underlying block cipher; and the effectiveness of the randomization used in reducing collision attacks when encrypting a sequence of blocks.

With regard to the security of the underlying block cipher, it is well known that encryption methods that are based on computationally hard problems, such as performing factorization or solving a discrete logarithm problem, are usually stronger than those that are not based on such problems. Integer factorization can be formulated as follows. For an integer n that is the product of two prime numbers p and q, the problem is to find the values of p and q given only n. The problem becomes more difficult for larger prime numbers. The discrete logarithm problem can be formulated as follows. Given a value g and a value y whose value is equal to $g^k$ defined over a group, find the value of k. This problem becomes more difficult for larger groups. Although the applications of integer factorization and discrete logarithm problems in designing block ciphers is known, the resulting ciphers are computationally more demanding than those currently used, such as AES.

With regard to the effectiveness of randomization and semantic security, the one-time pad is the only unconditionally semantically secure cipher presently in use. With the one-time pad, the sequence of keys does not repeat itself, i.e., it is said to have an infinite cycle. However, since the sending and the receiving correspondents must generate the same random sequence, the one-time pad is impractical because of the long sequence of the non-repeating key.

As a consequence, the keys needed to encrypt and decrypt in all private-key systems, including block ciphers, remain unchanged for every message block, or they are easily derived from one another by inference using identical random number generators at the sending and receiving correspondents. Further, these generators must be initialized to the same starting point at both correspondents in order to ensure correct encryption and decryption. This is true of all the existing block ciphers, including the RNS encryption and decryption methods described above.

Many methodologies exist for the implementation of pseudo-random number generators or adaptive mechanisms for pseudo-random generation of permutations. Such methods often include those based on tables that are used to increase randomization. However, no matter how good the randomization of the underlying generator is, it always has a finite number of states and, thus, the numbers generated by these generators have a finite cycle where a particular sequence is repeated one cycle after another. Therefore, such block ciphers are vulnerable to collision attacks, and the security of such block ciphers is ultimately dependant upon the randomness of the random number generator. The RNS encryption and decryption method described above is not an exception, and, as a consequence of this, one can conclude that semantic insecurity is inherent in all block ciphers, though with varying degrees.

In the following, existing ciphers where both the sending and the receiving correspondents have to generate the same random sequence will be referred to as "synchronized-randomization ciphers". Synchronized-randomization is achieved under the control of a key or some form of an initialization mechanism. Starting from this initial value, the subsequent keys are easily obtained by a random number generator. Therefore, synchronized-randomization between encryption and decryption is guaranteed as long as identical random number generators are used by both correspondents, and as long as the generators at both correspondents are synchronized to start from the same initial state. Thus, no unilateral change in the randomization method is allowed in synchronized-randomization.

With regard to hash functions based on mathematically difficult or complex problems, there are two well-known computationally difficult problems that are commonly used in cryptography. These are integer factorization and the discrete logarithm problem. One common hash function relies primarily on integer factorization and uses one modular exponentiation. Once the message has been converted into a long integer, a hash of the message can be computed as Hash(x)=g$^x$ mod n, where n=p*q and both p and q are large primes that are kept secret so that factoring of the modulus n=p*q becomes computationally infeasible. This hash function is provably collision resistant. The problem with using the integer factorization problem, such as that given above, is that for robust security, integers with 1,024 bits need to be used. This is very inefficient for hash functions and the associated computations.

Methods of adapting discrete logarithm-based algorithms to the setting of elliptic curves are known. However, finding discrete logarithms in this kind of group is particularly difficult. Elliptic curve-based cryptographic algorithms can be implemented using much smaller numbers than in a finite field setting of comparable cryptographic strength. Thus, the use of elliptic curve cryptography is an improvement over finite field-based public-key cryptography. In practice, an elliptic curve group over a finite field F is formed by choosing a pair of a and b coefficients, which are elements within F. The group consists of a finite set of points P(x,y) that satisfy the elliptic curve equation $F(x,y)=y^2-x^3-ax-b=0$, together with a point at infinity, O. The coordinates of the point, x and y, are elements of F represented in N-bit strings. In the following, a point is either written as a capital letter (e.g., point P) or as a pair in terms of the affine coordinates; i.e. (x,y).

The elliptic curve cryptosystem relies upon the difficulty of the elliptic curve discrete logarithm problem (ECDLP) to provide its effectiveness as a cryptosystem. Using multiplicative notation, the problem can be described as: given points B and Q in the group, find a number k such that $B^k=Q$; where k is the discrete logarithm of Q to the base B. Using additive notation, the problem becomes: given two points B and Q in the group, find a number k such that kB=Q.

In an elliptic curve cryptosystem, the large integer k is kept private and is often referred to as the secret key. The point Q and the base point B are made public, and are referred to as the public key. The security of the system, thus, relies upon the difficulty of deriving the secret k, knowing the public points B and Q. The main factor that determines the security strength of such a system is the size of its underlying finite field. In a real cryptographic application, the underlying field is made so large that it is computationally infeasible to determine k in a straightforward way by computing all the multiples of B until Q is found.

At the heart of elliptic curve geometric arithmetic is scalar multiplication, which computes kB by adding together k copies of the point B. Scalar multiplication is performed through a combination of point-doubling and point-addition operations. The point-addition operations add two distinct points together and the point-doubling operations add two copies of a point together. To compute, for example, B=(2*(2*(2B)))+2B=Q, it would take three point-doublings and two point-additions.

Addition of two points on an elliptic curve is calculated as follows. When a straight line is drawn through the two points, the straight line intersects the elliptic curve at a third point. The point symmetric to this third intersecting point with respect to the x-axis is defined as a point resulting from the addition. Doubling a point on an elliptic curve is calculated as follows. When a tangent line is drawn at a point on an elliptic curve, the tangent line intersects the elliptic curve at another point. The point symmetric to this intersecting point with respect to the x-axis is defined as a point resulting from the doubling.

Table I illustrates the addition rules for adding two points $(x_1,y_1)$ and $(x_2,y_2)$, i.e., $(x_3,y_3)=(x_1,y_1)+(x_2,y_2)$.

TABLE I

| Summary of Addition Rules: $(x_3, y_3) = (x_1, y_1) + (x_2, y_2)$ | |
|---|---|
| General Equations | $x_3 = m^2 - x_2 - x_1$ <br> $y_3 = m(x_3 - x_1) + y_1$ |
| Point Addition | $m = \dfrac{y_2 - y_1}{x_2 - x_1}$ |
| Point Doubling $(x_3, y_3) = 2(x_1, y_1)$ | $m = \dfrac{3x_1^2 - a}{2y_1}$ |
| $(x_2, y_2) = -(x_1, y_1)$ | $(x_3, y_3) = (x_1, y_1) + (-(x_2, y_2)) = O$ |
| $(x_2, y_2) = 0$ <br> $-(x_1, y_1)$ | $(x_3, y_3) = (x_1, y_1) + O = (x_1, y_1) =$ <br> $(x_1, -y_1)$ |

For elliptic curve encryption and decryption, given a message point $(x_m, y_m)$, a base point $(x_B, y_B)$, and a given key, k, the cipher point $(x_C, y_C)$ is obtained using the equation $(x_C, y_C) = (x_m, y_m) + k(x_B, y_B)$.

There are two basics steps in the computation of the above equations. The first step is to find the scalar multiplication of the base point with the key, $k(x_B, y_B)$. The resulting point is then added to the message point, $(x_m, y_m)$ to obtain the cipher point. At the receiver, the message point is recovered from the cipher point, which is usually transmitted along with the shared key and the base point $(x_m, y_m) = (x_C, y_C) - k(x_B, y_B)$.

As noted above, the x-coordinate, $x_m$, is represented as an N-bit string. However, not all of the N-bits are used to carry information about the data of the secret message. Assuming that the number of bits of the x-coordinate, $x_m$, that do not carry data is L, then the extra bits L are used to ensure that message data, when embedded into the x-coordinate, will lead to an $x_m$ value that satisfies the elliptic curve equation (1). Typically, if the first guess of $x_m$ is not on a curve, then the second or third try will be.

Thus, the number of bits used to carry the bits of the message data is (N−L). If the secret data is a K-bit string, then the number of elliptic curve points needed to encrypt the K-bit data is $$\left\lceil \frac{K}{N-L} \right\rceil.$$

It is important to note that the y-coordinate, $y_m$, of the message point carries no data bits.

Given a cubic equation in x defined over a finite field, F(p), of the form:

$$t = x^3 + ax + b \quad (1)$$

where $x \in F(p)$ $t \in F(p)$ $a \in F(p)$ and $b \in F(p)$, then any value of x will lead to a value of $t \in F(p)$. It should be noted that t could be either a quadratic residue or a non-quadratic residue (or quadratic non-residue; the terms "non-quadratic residue" and "quadratic non-residue" are used equivalently herein). If t is a quadratic residue, it can be written as $t = y^2$, and if t is a non-quadratic residue, it can be written as $t = \overline{\alpha} y^2$ where $\overline{\alpha}$ is a non-quadratic element of F(p), i.e., $\sqrt{\overline{\alpha}} \notin F(p)$. Thus, equation (1), can be written as:

$$\alpha y^2 = x^3 + ax + b \quad (2)$$

where $\alpha = 1$ if t is quadratic residue, and $\alpha = \overline{\alpha}$ if t is non-quadratic residue.

It should be noted that for a specific coefficient a,b∈F(p), when α=1, the resulting curve is an elliptic curve. However, if $\alpha=\bar{\alpha}$, this leads to a twist of the elliptic curve obtained with α=1. Thus, any value of x∈F(p) will lead to a point $(x,\sqrt{\alpha}y)$ that is either on an elliptic curve or its twist. If α=1, the point $(x,\sqrt{\alpha}y)$ is on the elliptic curve. If $\alpha=\bar{\alpha}$, the point $(x,\sqrt{\alpha}y)$ is on its twist.

Elliptic points can be formulated on a twist of an elliptic curve in the same fashion as they are formulated for elliptic curves. As result, elliptic curve cryptography can also be defined on twists of elliptic curves in the same manner as that described above. Equations for point addition on an elliptic curve or its twist are given in Table II below. If α=1, the equations are for point addition on an elliptic curve, and when $\alpha=\bar{\alpha}$, the equations are for point addition on its twist.

TABLE II

Summary of Addition Rules on elliptic curves or their twists:
$(x_3, \sqrt{\alpha}\,y_3) = (x_1, \sqrt{\alpha}\,y_1) + (x_2, \sqrt{\alpha}\,y_2)$

| | |
|---|---|
| General Equations | $x_3 = m^2 - x_2 - x_1$ <br> $\sqrt{\alpha}y_3 = m(x_3 - x_1) + \sqrt{\alpha}y_1$ |
| Point Addition | $m = \sqrt{\alpha}\,\dfrac{y_2 - y_1}{x_2 - x_1}$ |
| Point Doubling $(x_3, y_3) = 2(x_1, y_1)$ | $m = \dfrac{3x_1^2 - a}{2\sqrt{\alpha}\,y_1}$ |
| $(x_2, \sqrt{\alpha}y_2) = -(x_1, \sqrt{\alpha}y_1)$ <br> $(x_2, \sqrt{\alpha}y_2) = O$ <br> $-(x_1, \sqrt{\alpha}y_1)$ | $(x_3, \sqrt{\alpha}y_3) = (x_1, \sqrt{\alpha}y_1) + (-(x_2, \sqrt{\alpha}y_2)) = O$ <br> $(x_3, \sqrt{\alpha}y_3) = (x_1, \sqrt{\alpha}y_1) + O = (x_1, \sqrt{\alpha}y_1) =$ <br> $(x_1, -\sqrt{\alpha}y_1)$ |

The encryption and decryption equations are modified accordingly to:

$$(x_C,\sqrt{\alpha}y_C)=(x_m,\sqrt{\alpha}y_m)+k(x_B,\sqrt{\alpha}y_B) \quad (3);$$

and $$(x_m,\sqrt{\alpha}y_m)=(x_C,\sqrt{\alpha}y_C)-k(x_B,\sqrt{\alpha}y_B) \quad (4).$$

Clearly, when α=1, equations (3) and (4) are the cryptography equations over an elliptic curve, and when $\alpha=\bar{\alpha}$, equations (3) and (4) define the cryptography equations over its twist.

There is an attack method referred to as power analysis in that the secret information is decrypted on the basis of leaked information. In this attack method, changes in voltage resulting from cryptographic processing of secret information, such as DES (Data Encryption Standard) encrypted messages or the like, are measured so that the encryption process of the cryptographic processing is identified, and the secret information is inferred once the basis of the encryption process is known.

As one of the measures against power analysis attack on elliptic curve cryptosystems, an encryption method using randomized projective coordinates is used. This is an effective measure against an attack method that observes whether a specific value appears or not in scalar multiplication calculations, and inferring a scalar value from the observed result. By multiplication with a random value, the appearance of such a specific value cannot be observed or inferred.

In the above-described elliptic curve cryptosystem, attack by power analysis, such as DPA or the like, was not taken into consideration. Therefore, in order to relieve an attack by power analysis, extra calculation has to be carried out using secret information in order to weaken the dependence of the encryption process and the secret information on each other. Thus, time required for the cryptographic processing increases so that cryptographic processing efficiency is lowered.

With the development of information communication networks, cryptographic techniques have been indispensable elements for the concealment or authentication of electronic information. Efficiency in terms of computation time is a necessary consideration, along with the security of the cryptographic techniques. The elliptic curve discrete logarithm problem is so difficult that elliptic curve cryptosystems can make key lengths shorter than in Rivest-Shamir-Adleman (RSA) cryptosystems, which base their security on the difficulty of factorization into prime factors. Thus, the elliptic curve cryptosystems offer comparatively high-speed cryptographic processing with optimal security. However, the processing speed is not always high enough to satisfy smart cards, for example, which have restricted throughput or servers that have to carry out large volumes of cryptographic processing.

The pair of equations for m in Table I are referred to as "slope equations". Computation of a slope equation in finite fields requires one finite field division. Alternatively, the slope computation can be computed using one finite field inversion and one finite field multiplication. Finite field division and finite field inversion are costly in terms of computational time because they require extensive CPU cycles for the manipulation of two elements of a finite field with a large order. Presently, it is commonly accepted that a point-doubling and a point-addition operation each require one inversion, two multiplications, a square, and several additions. At present, there are techniques to compute finite field division and finite field inversion, and techniques to trade time-intensive inversions, for relatively quicker multiplication operations through performance of the operations in projective coordinates.

In cases where field inversions are significantly more time intensive than multiplication, it is efficient to utilize projective coordinates. An elliptic curve projective point (X,Y,Z) in conventional projective (or homogeneous) coordinates satisfies the homogeneous Weierstrass equation: $\tilde{F}(X,Y,Z)=Y^2Z-X^3-aXZ^2-bZ^3=0$, and, when Z≠0, it corresponds to the affine point $$(x, y) = \left(\frac{X}{Z}, \frac{Y}{Z}\right).$$

Other projective representations lead to more efficient implementations of the group operation, such as the Jacobian representations, where the triplets (X,Y,Z) correspond to the affine coordinates $$(x, y) = \left(\frac{X}{Z^2}, \frac{Y}{Z^3}\right)$$

whenever Z≠0. This is equivalent to using a Jacobian elliptic curve equation that is of the form $\tilde{F}_J(X,Y,Z)=Y^2-X^3-aXZ^4-bZ^6=0$.

Another commonly used projection is the Chudnovsky-Jacobian coordinate projection. In general terms, the relationship between the affine coordinates and the projection coordinates can be written as $$(x, y) = \left(\frac{X}{Z^i}, \frac{Y}{Z^j}\right)$$

where the values of i and j depend on the choice of the projective coordinates. For example, for homogeneous coordinates, i=1 and j=1.

The use of projective coordinates circumvents the need for division in the computation of each point addition and point doubling during the calculation of scalar multiplication. Thus, finite field division can be avoided in the calculation of scalar multiplication, $$k\left(\frac{X_B}{Z_B^i}, \frac{Y_B}{Z_B^j}\right),$$

when using projective coordinates.

The last addition for the computation of the cipher point, $$\left(\frac{X_C}{Z_C^i}, \frac{Y_C}{Z_C^j}\right),$$

i.e., the addition of the two points $$\left(\frac{X_m}{Z_m^i}, \frac{Y_m}{Z_m^j}\right) \text{ and } k\left(\frac{X_B}{Z_B^i}, \frac{Y_B}{Z_B^j}\right),$$

can also be carried out in the chosen projection coordinate:

$$\left(\frac{X_C}{Z_C^i}, \frac{Y_C}{Z_C^j}\right) = \left(\frac{X_m}{Z_m^i}, \frac{Y_{m1}}{Z_m^j}\right) + \left(\frac{X_B}{Z_B^i}, \frac{Y_B}{Z_B^j}\right).$$

It should be noted that $Z_m=1$.

However, one division (or one inversion and one multiplication) must still be carried out in order to calculate $$x_C = \frac{X_C}{Z_C^i},$$

since only the affine x-coordinate of the cipher point, $x_C$, is sent by the sender.

Thus, the encryption of (N−L) bits of the secret message using elliptic curve encryption requires at least one division when using projective coordinates. Similarly, the decryption of a single message encrypted using elliptic curve cryptography also requires at least one division when using projective coordinates.

As noted above, hash functions that are based on known mathematically difficult problems, such as the discrete logarithm problem, are more secure than those that are not based on such problems. The difficulty of using elliptic curve cryptography to develop hash functions is in the iterative and non-deterministic method needed to embed a bit string into an elliptic curve point. Further, the iterative embedding methods used in existing elliptic curve cryptography have the additional drawback of the number of iterations needed being different for different bit strings that are being embedded. As a consequence, different encryption times are needed for different blocks of bit strings. Such a data dependant encryption time is not suitable for hash functions, which require data independent hash generation time.

Thus, hash functions using elliptic curve cryptography solving the aforementioned problems is desired.

SUMMARY OF THE INVENTION

The hash functions using elliptic curve cryptography are directed towards hash functions employing elliptic curve encryption algorithms. Such hash functions are based upon the difficulty of solving the elliptic curve discrete logarithm problem. As noted above, security using hash functions is dependent upon the implementation of a computationally difficult problem, and the elliptic curve discrete logarithm problem provides enough relative difficulty in computation to ensure that the hash functions are optimally secure.

The hash functions use both an elliptic curve and its twist simultaneously in a single encryption method. It should be noted that this method remains valid even if the elliptic curve and its twist are not isomorphic with respect to one another.

In a representative embodiment, the hash function algorithm includes the steps of: (a) selecting an elliptic curve EC that satisfies $y^2=x^3+ax+b$, wherein x and y are Cartesian coordinates; (b) selecting a twist TEC of the elliptic curve EC that satisfies $\overline{\alpha}y^2=x^3+ax+b$, wherein $\overline{\alpha}$ is non-quadratic residue of a finite field F; (c) specifying a set of coefficients a,b∈F; (d) specifying a base point on the elliptic curve $(x_B, y_B) \in EC$ and a base point on the twist of the elliptic curve $(x_{TB}, \sqrt{\overline{\alpha}}y_{TB}) \in TEC$; (e) furnishing the set of coefficients, the base point on the elliptic curve, and the base point on the twist of the elliptic curve as public information; (f) selecting a pair of random numbers $k_1,k_2$, wherein the pair of random numbers are private information and the pair of random numbers are scalars; (g) computing scalar multiplication of the random number $k_1$ with the base point $(x_B,y_B)$ to produce the scalar multiplication product $(x_{Pu},y_{Pu})=k_1(x_B,y_B)$; (h) computing scalar multiplication of the random number $k_2$ with the base point $(x_{TB},\sqrt{\overline{\alpha}}y_{TB})$ to produce the scalar multiplication product $(x_{TPu},\sqrt{\overline{\alpha}}y_{TPu})=k_2(x_{TB},\sqrt{\overline{\alpha}}y_{TB})$; (i) furnishing the scalar multiplication products $(x_{Pu},y_{Pu})$ and $(x_{TPu},\sqrt{\overline{\alpha}}y_{TPu})$ as public information; (j) processing a message bit string to produce a bit string that is a multiple of N bits, wherein N is a selected natural number; (k) computing an initial hash point $(x_{c_1},y_{c_1})$ on the elliptic curve; (l) computing an initial hash point $(x_{Tc_1}, \sqrt{\overline{\alpha}}y_{Tc_1})$ on the twist of the elliptic curve; (m) selecting integers i and u so that a compressed media data bit string length is equal to (u+1)N, and thereafter setting i=2; (n) embedding a message N bit string of an $i^{th}$ block into the x-coordinate of the elliptic message point $(x_{m_i},\sqrt{\alpha_{m_i}}y_{m_i})$ using non-iterative embedding; (o) computing the set of hash points as $(x_{c_i},y_{c_i})=(x_{m_i},y_{m_i})+(x_{c_{i-1}},y_{c_{i-1}})$ and $(x_{Tc_i},\sqrt{\overline{\alpha}}y_{Tc_i})=(x_{Tc_{i-1}},\sqrt{\overline{\alpha}}y_{Tc_{i-1}})$ if $\alpha_{m_i}=1$; (p) computing the set of hash points as $(x_{Tc_i},\sqrt{\overline{\alpha}}y_{Tc_i})=(x_{m_i},\sqrt{\overline{\alpha}}y_{m_i})+(x_{Tc_{i-1}},\sqrt{\overline{\alpha}}y_{Tc_{i-1}})$ and $(x_{c_i},y_{c_i})=(x_{c_{i-1}},y_{c_{i-1}})$ if $\alpha_{m_i} \neq 1$; (q) repeating steps (l), (m), and (n) until i>u, and (r) concatenating bits of the x-coordinate $x_c$ and the sign bit of the y-coordinate $y_c$ of a hash point $(x_{c_u},y_{c_u})$, along with the bits of the x-coordinates $x_{Tc}$ and the sign bit of the y-coordinate $y_{Tc}$ of a hash point $(x_{Tc_u},\sqrt{\overline{\alpha}}y_{Tc_u})$ to form a hash bit string.

The hash functions may be carried out in software or in hardware and used for encrypting digital signatures in electronic communications, encrypting passwords for maintaining file security on servers or over networks, and for any other application where hash functions are conventionally used.

These and other features of the present invention will become readily apparent upon further review of the following specification.

DETAILED DESCRIPTION OF THE PREFERRED EMBODIMENTS

The hash functions using elliptic curve cryptography are directed towards hash functions employing elliptic curve encryption algorithms. Such hash functions are based upon the difficulty of solving the elliptic curve discrete logarithm problem. As noted above, security using hash functions is dependent upon the implementation of a computationally difficult problem, and the elliptic curve discrete logarithm problem provides enough relative difficulty in computation to ensure that the hash functions are optimally secure.

The hash functions to be described in greater detail below use both an elliptic curve and its twist simultaneously in a single encryption method. It should be noted that this method remains valid even if the elliptic curve and its twist are not isomorphic with respect to one another.

Since the hash functions use both an elliptic curve and its twist, any bit strings can be embedded in a non-iterative manner into a single point, which is located either on the elliptic curve or its twist, i.e., the time needed to embed a bit string into a point is always the same and it is independent of the string's constituent bits. This results in the advantage of having the same hash generation time independently of the bit strings being processed.

The general difficulty of using conventional elliptic curve cryptography to develop hash functions is in the iterative and non-deterministic method needed to embed a bit string into an elliptic curve point. The difficult arises when the number of iterations needed to embed a bit string into a point is different for different bit strings that are being embedded. As a consequence, different hash generation times are needed for different blocks of bit strings. Such a data-dependant generation time is not suitable for hash functions, as it requires data buffers having unpredictable lengths. The time needed to generate a hash for a bit string of a given length should be independent of the values of the constituent bits. Such cannot be achieved using conventional elliptic curve cryptography. Further, the iterative and non-deterministic method of conventional elliptic curve cryptography requires that, given an elliptic curve defined over a finite field that needs N-bits for representation of its elements, only (N−L) bits of the message data bits can be embedded in any elliptic curve point.

In the hash functions using elliptic curve cryptography, the time needed to generate a hash for a bit string of a given length is independent of the values of the constituent bits. Further, up to N bits (i.e., more than (N−L) bits) may be embedded in each elliptic curve point. Projective coordinates are used at the sending and receiving entities in order to eliminate inversion or division during each point addition and doubling operation of the scalar multiplication. Further, the hash functions are scalable, as will be described in detail below.

In the following, it is assumed that the maximum block size that can be embedded into the x-coordinate is N bits, and that the compressed media data bit string length is a multiple of N, such as (u+1)N, i.e., the number of N-bit blocks in a message bit string is (u+1).

Given $\bar{\alpha} \in F(p)$, a non-quadratic residue element of F(p) (i.e., $\sqrt{\bar{\alpha}} \notin F(p)$), a point that could be either on an elliptic curve, $y^2=x^3+ax+b$, or its twist, $\bar{\alpha}y^2=x^3+ax+b$, can be represented as $(x,\sqrt{\alpha}y)$, where $\alpha$ is either equal to 1 or $\bar{\alpha}$. If $\alpha=1$, then the point $(x,\sqrt{\alpha}y)$ lies on an elliptic curve, and if $\alpha=\bar{\alpha}$, the point lies on its twist. In the following, EC represents the set of points that satisfy an elliptic curve equation, and TEC represents the set of points that satisfy its twist.

The following methods all incorporate a noniterative process for embedding a message bit string into a point $(x,\sqrt{\alpha}y)$ that satisfies either the elliptic curve equation $y^2=x^3+ax+b$ or its twist, $\bar{\alpha}y^2=x^3+ax+b$. The process begins by dividing the message bit string into N-bit strings and denoting the $i^{th}$ as $m_i$. The value of the bit string $m_i$ is assigned to $x_{m_i}$. The value $t_{m_i}$ is computed by substituting $x_{m_i}$ into the equation:

$$t_{m_i}=x_{m_i}^3+ax+b \qquad (5).$$

If $t_{m_i}$ is a quadratic residue, then $y_{m_i}=\sqrt{t_{m_i}}$ and the point is given as $(x_{m_i},y_{m_i})$. On the other hand, if $t_{m_i}$ is a non-quadratic residue, then $$y_{m_i} = \sqrt{\frac{t_{m_i}}{\bar{\alpha}}}$$

and the point is given as $(x_m,\sqrt{\bar{\alpha}}y_m)$. The message point is then denoted as $(x_m,\sqrt{\alpha_m}y_m)$, where the point is on the elliptic curve if $\alpha_{m_i}=1$, and the point is on the twist if $\alpha_m=\bar{\alpha}$.

In a first embodiment of the hash functions using elliptic curve cryptography, coefficients $a,b \in F$ are specified, along with a base point on an elliptic curve, $(x_B,y_B) \in EC$, and a base point on its twist, $(x_{TB},\sqrt{\bar{\alpha}}y_{TB}) \in TEC$. The coefficients and base points are all made public.

Next, a pair of random numbers $k_1,k_2$ are selected as scalar values, and are kept secret for the specific hash function to be used. Following this selection, multiplication of the scalar $k_1$ with the point $(x_B,y_B)$ is computed in order to obtain the scalar multiplication product $(x_{Pu}, y_{Pu})=k_1(x_B,y_B)$. Multiplication of the scalar $k_2$ with the point $(x_{TB},\sqrt{\bar{\alpha}}y_{TB})$ is also computed to obtain the scalar multiplication product $(x_{TPu}, \sqrt{\bar{\alpha}}y_{TPu})=k_2(x_{TB},\sqrt{\bar{\alpha}}y_{TB})$.

Following this multiplication step, the two scalar multiplication points $(x_{Pu},y_{Pu})$ and $(x_{TPu},\sqrt{\bar{\alpha}}y_{TPu})$ are made public. The above steps set up the hash function parameters. In order to generate the hash bit string of a message bit string, the message bit string is pre-processed to obtain a bit string that is a multiple of N-bits.

Next, the initial hash point, $(x_{c_1},y_{c_1})$ is computed on the elliptic curve by multiplying the scalar integer value, $k_{m_0}$, of the N-bit string of the initial block of the message with the point $(x_{Pu},y_{Pu})$, resulting in $(x_{c_1},y_{c_1})=k_{m_0}(x_{Pu},y_{Pu})$. Following this multiplication, the initial hash point $(x_{Tc_1},\sqrt{\bar{\alpha}}y_{c_1})$ is computed on the twist of the elliptic curve by multiplying the scalar integer value $k_{m_1}$ of the N-bit string of the next block of the message with the point $(x_{TPu},\sqrt{\bar{\alpha}}y_{TPu})$, resulting in $(x_{Tc_1}, \sqrt{\bar{\alpha}}y_{Tc_1})=k_{m_1}(x_{TPu},\sqrt{\bar{\alpha}}y_{TPu})$.

Beginning with i=2, the following two steps are repeated until i>u. The message N-bit string of the $i^{th}$ block is embedded into the x-coordinate of the elliptic message point $(x_{m_i}, \sqrt{\bar{\alpha_{m_i}}}y_{m_i})$ using the noniterative embedding process described above. Then, if the message point of the $i^{th}$ block is on the elliptic curve, i.e., $\alpha_{m_i}=1$, the hash points are computed using $(x_{c_i},y_{c_i})=(x_{m_i},y_{m_i})+(x_{c_{i-1}},y_{c_{i-1}})$ and $(x_{Tc_i},\sqrt{\bar{\alpha}}y_{Tc_i})=(x_{Tc_{i-1}}, \sqrt{\bar{\alpha}}y_{Tc_{i-1}})$. Otherwise, the hash points are computed using $(x_{Tc_i},\sqrt{\bar{\alpha}}y_{Tc_i})=(x_{m_i},\sqrt{\bar{\alpha}}y_{m_i})+(x_{Tc_{i-1}},\sqrt{\bar{\alpha}}y_{Tc_{i-1}})$ and $(x_{c_i},y_{c_i})=(x_{c_{i-1}}, y_{c_{i-1}})$.

Following the above iteration, the appropriate bits of the x-coordinate $x_c$ and the sign bit of the y-coordinate $y_c$ of the hash point $(x_{c_u}, y_{c_u})$ along with the appropriate bits of the x-coordinates $x_{Tc}$ and the sign bit of the y-coordinate $y_{Tc}$ of the hash point $(x_{Tc_u}, \sqrt{\alpha} y_{Tc_u})$ are concatenated together to form the hash bit string.

In a second embodiment of the hash functions using elliptic curve cryptography, the hash function parameters are set up in the same manner as in the first embodiment: First, in a manner similar to that described above, the coefficients a,b∈F are specified, along with a base point on an elliptic curve $(x_B, y_B) \in EC$ and a base point on its twist $(x_{TB}, \sqrt{\alpha} y_{TB}) \in TEC$. The coefficients and base points are all made public.

Next, in a manner similar to that described above, a pair of random numbers $k_1, k_2$ are selected as scalar values, both of which are kept secret for the specific hash function to be used. Following this selection, multiplication of the scalar $k_1$ with the point $(x_B, y_B)$ is computed in order to obtain the scalar multiplication product $(x_{Pu}, y_{Pu}) = k_1(x_B, y_B)$. Multiplication of the scalar $k_2$ with the point $(x_{TB}, \sqrt{\alpha} y_{TB})$ is also computed in order to obtain the scalar multiplication product $(x_{TPu}, \sqrt{\alpha} y_{TPu}) = k_2(x_{TB}, \sqrt{\alpha} y_{TB})$. The two scalar multiplication points $(x_{Pu}, y_{Pu})$ and $(x_{TPu}, \sqrt{\alpha} y_{TB})$ are made public.

In order to generate the hash bit string of a message bit string, the message bit string is pre-processed to obtain a bit string that is a multiple of N-bits. Then, the point $(x_{S_1}, y_{S_1})$ is computed on the elliptic curve by multiplying the scalar integer value $k_{m_0}$ of the N-bit string of the initial block of the message with the point $(x_{Pu}, y_{Pu})$, i.e., $(x_{S_1}, y_{S_1}) = k_{m_0}(x_{Pu}, y_{Pu})$.

Following this multiplication, the point $(x_{TS_1}, \sqrt{\alpha} y_{TS_1})$ is computed on the twist of the elliptic curve by multiplying the scalar integer value $k_{m_1}$ of the N-bit string of the next block of the message with the point $(x_{TPu}, \sqrt{\alpha} y_{TPu})$, i.e., $(x_{TS_1}, \sqrt{\alpha} y_{TS_1}) = k_{m_1}(x_{TPu}, \sqrt{\alpha} y_{TPu})$. The hash points are then initialized by setting $(x_{c_1}, y_{c_1}) = (x_{S_1}, y_{S_1})$ and $(x_{Tc_1}, \sqrt{\alpha} y_{Tc_1}) = (x_{TS_1}, \sqrt{\alpha} y_{TS_1})$.

Then, starting with i=2, the following three steps are repeated until i>u. The message N-bit string of the $i^{th}$ block is embedded into the x-coordinate of the elliptic message point $(x_{m_i}, \sqrt{\alpha_{m_i}} y_{m_i})$ using the noniterative embedding process described above. Then the points $(x_{S_i}, y_{S_i})$ and $(x_{TS_i}, y_{TS_i})$ are both doubled, i.e., $(x_{S_i}, y_{S_i}) = 2(x_{S_{i-1}}, y_{S_{i-1}})$ and $(x_{TS_i}, y_{TS_i}) = 2(x_{TS_{i-1}}, \sqrt{\alpha} y_{TS_{i-1}})$. If the message point of the $i^{th}$ block is on the elliptic curve (i.e., $\alpha_{m_i} = 1$), then the hash points are computed using $(x_{c_i}, y_{c_i}) = (x_{m_i}, y_{m_i}) + (x_{m_{i-1}}, y_{m_{i-1}}) + (x_{S_i}, y_{S_i})$ and $(x_{Tc_i}, \sqrt{\alpha} y_{Tc_i}) = (x_{Tc_{i-1}}, \sqrt{\alpha} y_{Tc_{i-1}})$. Otherwise, the hash points are computed as $(x_{Tc_i}, \sqrt{\alpha} y_{Tc_i}) = (x_{m_i}, \sqrt{\alpha} y_{m_i}) + (x_{m_{i-1}}, \sqrt{\alpha} y_{m_{i-1}}) + (x_{TS_i}, \sqrt{\alpha} y_{TS_i})$ and $(x_{c_i}, y_{c_i}) = (x_{c_{i-1}}, y_{c_{i-1}})$.

Following the above three-step iteration, the appropriate bits of the x-coordinate $x_c$ and the sign bit of the y-coordinate $y_c$ of the hash point $(x_{c_u}, y_{c_u})$, and the appropriate bits of the x-coordinates $x_{Tc}$ and the sign bit of the y-coordinate $y_{Tc}$ of the hash point $(x_{Tc_u}, \sqrt{\alpha} y_{Tc_u})$ are concatenated together to form the hash bit string.

In a third embodiment of the hash functions using elliptic curve cryptography, let $S_{m_i}$ represent the N-bit string of the $i^{th}$ message block. The hash function parameters are set up in a manner similar to that described above in the first and second embodiments. First, the coefficients a,b∈F are specified, along with a base point on an elliptic curve $(x_B, y_B) \in EC$ and a base point on its twist $(x_{TB}, \sqrt{\alpha} y_{TB}) \in TEC$. These coefficients and base points are made public.

Next, a pair of random numbers $k_1, k_2$ are selected as scalar values, and are kept secret for the specific hash function to be used. Following this selection, multiplication of the scalar $k_1$ with the point $(x_B, y_B)$ is computed in order to obtain the scalar multiplication product $(x_{Pu}, y_{Pu}) = k_1(x_B, y_B)$, and multiplication of the scalar $k_2$ with the point $(x_{TB}, \sqrt{\alpha} y_{TB})$ is computed in order to obtain the scalar multiplication product, $(x_{TPu}, \sqrt{\alpha} y_{TPu}) = k_2(x_{TB}, \sqrt{\alpha} y_{TB})$. The two scalar multiplication points $(x_{Pu}, y_{Pu})$ and $(x_{TPu}, \sqrt{\alpha} y_{TPu})$ are made public. Finally, an initial vector $S_{m_1}$ is selected and made public.

In order to generate the hash bit string of a message bit string, the message bit string is pre-processed to obtain a bit string that is a multiple of N-bits. Then, the initial hash point $(x_{S_1}, y_{S_1})$ is computed on the elliptic curve by multiplying the scalar integer value $k_{m_0}$ of the N-bit string of the initial block of the message with the point $(x_{Pu}, y_{Pu})$, i.e., $(x_{S_1}, y_{S_1}) = k_{m_0}(x_{Pu}, y_{Pu})$.

The initial hash point $(x_{TS_1}, \sqrt{\alpha} y_{TS_1})$ is then computed on the twist of the elliptic curve by multiplying the scalar integer value $k_{m_1}$ of the N-bit string of the next block of the message with the point $(x_{TPu}, \sqrt{\alpha} y_{TPu})$, i.e., $(x_{TS_1}, \sqrt{\alpha} y_{TS_1}) = k_{m_1}(x_{TPu}, \sqrt{\alpha} y_{TPu})$. The hash points are initialized as $(x_{c_1}, y_{c_1}) = (x_{S_1}, y_{S_1})$ and $(x_{Tc_1}, \sqrt{\alpha} y_{Tc_1}) = (x_{TS_1}, \sqrt{\alpha} y_{TS_1})$.

Starting with i=2, the following four steps are repeated until i>u. Denoting $S_{m_i}$ as the N-bit string of the $i^{th}$ block of the message, the N-bit string $S'_{m_i}$ is computed as $S'_{m_i} = S_{m_i} \oplus S_{m_{i-1}}$. Then the N-bit string $S_{m_i}$ is embedded into the x-coordinate of the elliptic message point $(x_{m_i}, \sqrt{\alpha_{m_i}} y_{m_i})$ using the noniterative embedding method described above. The points $(x_{S_i}, y_{S_i})$ and $(x_{TS_i}, y_{TS_i})$ are then doubled, i.e., $(x_{S_i}, y_{S_i}) = 2(x_{S_{i-1}}, y_{S_{i-1}})$ and $(x_{TS_i}, y_{TS_i}) = 2(x_{TS_{i-1}}, \sqrt{\alpha} y_{TS_{i-1}})$. If the message point of the $i^{th}$ block is on the elliptic curve (i.e., $\alpha_{m_i} = 1$), the hash points are computed using $(x_{c_i}, y_{c_i}) = (x_{m_i}, y_{m_i}) + (x_{m_{i-1}}, y_{m_{i-1}}) + (x_{S_i}, y_{S_i})$ and $(x_{Tc_i}, \sqrt{\alpha} y_{Tc_i}) = (x_{Tc_{i-1}}, \sqrt{\alpha} y_{Tc_{i-1}})$. Otherwise, the hash points are computed as $(x_{Tc_i}, \sqrt{\alpha} y_{Tc_i}) = (x_{m_i}, \sqrt{\alpha} y_{m_i}) + (x_{m_{i-1}}, \sqrt{\alpha} y_{m_{i-1}}) + (x_{TS_i}, \sqrt{\alpha} y_{TS_i})$ and $(x_{c_i}, y_{c_i}) = (x_{c_{i-1}}, y_{c_{i-1}})$.

Following the above four-step iteration, the appropriate bits of the x-coordinate $x_c$ and the sign bit of the y-coordinate $y_c$ of the hash point $(x_{c_u}, y_{c_u})$, and the appropriate bits of the x-coordinates $x_{Tc}$ and the sign bit of the y-coordinate $y_{Tc}$ of the hash point $(x_{Tc_u}, \sqrt{\alpha} y_{Tc_u})$ are concatenated together to form the hash bit string.

The above hash function procedures may also be applied to finding the hash bit string for bit streams of media data, such as text, audio, video, or multimedia data. These hash functions may also be applied to the verification of media data. For efficiency of computation, the above methods are used with a pre-processing stage that is used to compress the media data prior to the application of the hash functions. Either a lossless compression method or a "lossy" compression method may be used to compress the media data in the pre-processing stage. The bit string of the compressed message at the output of the pre-processing stage is then used as the input to the above hash generation methods.

In the following alternative embodiments, it is assumed that the maximum block size that can be embedded into the x-coordinate is N bits, and that the compressed media data bit string length is a multiple of N, such as (u+1)N, i.e., the number of N-bit blocks in a message bit string is (u+1).

In a fourth embodiment of hash functions using elliptic curve cryptography, the hash function parameters are set up by first specifying coefficients a,b∈F and a base point on an elliptic curve $(x_B, y_B) \in EC$, along with a base point on its twist $(x_{TB}, \sqrt{\alpha} y_{TB}) \in TEC$, the coefficients and the base points being made public. Following this specification, a pair of random numbers $k_1, k_2$ are selected as scalar values, which are both kept secret for the specific hash function to be used.

Next, multiplication of the scalar $k_1$ with the point $(x_B, y_B)$ is computed in order to obtain the scalar multiplication product $(x_{Pu}, y_{Pu}) = k_1(x_B, y_B)$, and multiplication of the scalar $k_2$ with the point $(x_{TB}, \sqrt{\alpha} y_{TB})$ is also computed in order to obtain the scalar multiplication product $(x_{TPu}, \sqrt{\alpha} y_{TPu}) = k_2(x_{TB},$ $\sqrt{\overline{\alpha}}y_{TB}$). The two scalar multiplication points $(x_{Pu},y_{Pu})$ and $(x_{TPu},\sqrt{\overline{\alpha}}y_{TPu})$ are made public. A media compression method is specified, and this specification is also made public.

In order to generate the hash bit string of a message bit string, the media data to be sent is compressed using the agreed upon compression method, in order to generate a compressed message data bit string. The bit string is then divided into blocks of N-bits. Following this division, the message bit string is pre-processed to obtain a bit string that is a multiple of N-bits. Then, the initial hash point $(x_{c_1},y_{c_1})$ is computed on the elliptic curve by multiplying the scalar integer value $k_{m_0}$ of the N-bit string of the initial block of the message with the point $(x_{Pu},y_{Pu})$, i.e., $(x_{c_1},y_{c_1})=k_{m_0}(x_{Pu},y_{Pu})$. The initial hash point $(x_{Tc_1},\sqrt{\overline{\alpha}}y_{Tc_1})$ is then computed on the twist of the elliptic curve by multiplying the scalar integer value $k_{m_1}$ of the N-bit string of the next block of the message with the point $(x_{TPu},\sqrt{\overline{\alpha}}y_{TPu})$, i.e., $(x_{Tc_1},\sqrt{\overline{\alpha}}y_{Tc_1})=k_{m_1}(x_{TPu},\sqrt{\overline{\alpha}}y_{TPu})$.

Following this multiplication, the next two steps are repeated, starting with i=2, until i>u. The message N-bit string of the i$^{th}$ block is embedded into the x-coordinate of the elliptic message point $(x_{m_i},\sqrt{\overline{\alpha_{m_i}}}y_{m_i})$ using the noniterative embedding process described above. If the message point of the i$^{th}$ block is on the elliptic curve (i.e., $\alpha_{m_i}=1$), the hash points are computed using $(x_{c_i},y_{c_i})=(x_{m_i},y_{m_i})+(x_{c_{i-1}},y_{c_{i-1}})$ and $(x_{Tc_i},\sqrt{\overline{\alpha}}y_{Tc_i})=(x_{Tc_{i-1}},\sqrt{\overline{\alpha}}y_{Tc_{i-1}})$. Otherwise, they are computed using $(x_{Tc_i},\sqrt{\overline{\alpha}}y_{Tc_i})=(x_{m_i},\sqrt{\overline{\alpha}}y_{m_i})+(x_{Tc_{i-1}},\sqrt{\overline{\alpha}}y_{Tc_{i-1}})$ and $(x_{c_i},y_{c_i})=(x_{c_{i-1}},y_{c_{i-1}})$.

The appropriate bits of the x-coordinate $x_c$, and the sign bit of the y-coordinate $y_c$ of the hash point $(x_{c_u},y_{c_u})$, along with the appropriate bits of the x-coordinates $x_{Tc}$ and the sign bit of the y-coordinate $y_{Tc}$ of the hash point $(x_{Tc_u},\sqrt{\overline{\alpha}}y_{Tc_u})$ are then concatenated together to form the hash bit string.

In a fifth embodiment of hash functions using elliptic curve cryptography, the hash function parameters may be set up by first specifying the coefficients $a,b \in F$ and a base point on an elliptic curve, $(x_B,y_B) \in EC$, along with a base point on its twist $(x_{TB},\sqrt{\overline{\alpha}}y_{TB}) \in TEC$, which are all made public. A pair of random numbers $k_1,k_2$ are then selected as scalar values, which are kept secret for the specific hash function to be used.

Following this selection, multiplication of the scalar $k_1$ with the point $(x_B,y_B)$ is computed in order to obtain the scalar multiplication product $(x_{Pu},y_{Pu})=k_1(x_B,y_B)$, and multiplication of the scalar $k_2$ with the point $(x_{TB},\sqrt{\overline{\alpha}}y_{TB})$ is computed in order to obtain the scalar multiplication product $(x_{TPu},\sqrt{\overline{\alpha}}y_{TPu})=k_2(x_{TB},\sqrt{\overline{\alpha}}y_{TB})$. The two scalar multiplication points $(x_{Pu},y_{Pu})$ and $(x_{TPu},\sqrt{\overline{\alpha}}y_{TPu})$ are made public, and a media compression method is specified and also made public.

In order to generate the hash bit string of a message bit string, the media data to be sent is compressed using the agreed upon method in order to generate a compressed message data bit string. This is then divided into blocks of N-bits. Following this division, the message bit string is pre-processed to obtain a bit string that is a multiple of N-bits. Next, the initial hash point $(x_{S_1},y_{S_1})$ is computed on the elliptic curve by multiplying the scalar integer value $k_{m_0}$ of the N-bit string of the initial block of the message with the point $(x_{Pu},y_{Pu})$, i.e., $(x_{S_1},y_{S_1})=k_{m_0}(x_{Pu},y_{Pu})$, and the initial hash point $(x_{TS_1},\sqrt{\overline{\alpha}}y_{TS_1})$ is also computed on the twist of the elliptic curve by multiplying the scalar integer value $k_{m_1}$ of the N-bit string of the next block of the message with the point $(x_{TPu},\sqrt{\overline{\alpha}}y_{TPu})$, i.e., $(x_{TS_1},\sqrt{\overline{\alpha}}y_{TS_1})=k_{m_1}(x_{TPu},\sqrt{\overline{\alpha}}y_{TPu})$. The hash points are initialized as $(x_{c_1},y_{c_1})=(x_{S_1},y_{S_1})$ and $(x_{Tc_1},\sqrt{\overline{\alpha}}y_{Tc_1})=(x_{TS_1},\sqrt{\overline{\alpha}}y_{TS_1})$.

Starting with i=2, the following three steps are repeated until i>u. The message N-bit string of the i$^{th}$ block is embedded into the x-coordinate of the elliptic message point $(x_{m_i},\sqrt{\overline{\alpha_{m_i}}}y_{m_i})$ using the noniterative embedding process described above. The points $(x_{S_i},y_{S_i})$ and $(x_{TS_i},y_{TS_i})$ are doubled, i.e., $(x_{S_i},y_{S_i})=2(x_{S_{i-1}},y_{S_{i-1}})$ and $(x_{TS_i},y_{TS_i})=2(x_{TS_{i-1}},\sqrt{\overline{\alpha}}y_{TS_{i-1}})$. If the message point of the i$^{th}$ block is on the elliptic curve (i.e., $\alpha_{m_i}=1$), then the hash points are computed using $(x_{c_i},y_{c_i})=(x_{m_i},y_{m_i})+(x_{m_{i-1}},y_{m_{i-1}})+(x_{S_i},y_{S_i})$ and $(x_{Tc_i},\sqrt{\overline{\alpha}}y_{Tc_i})=(x_{Tc_{i-1}},\sqrt{\overline{\alpha}}y_{Tc_{i-1}})$. Otherwise, the hash points are computed using $(x_{Tc_i},\sqrt{\overline{\alpha}}y_{Tc_i})=(x_{m_i},\sqrt{\overline{\alpha}}y_{m_i})+(x_{m_{i-1}},\sqrt{\overline{\alpha}}y_{m_{i-1}})+(x_{TS_i},\sqrt{\overline{\alpha}}y_{TS_i})$ and $(x_{c_i},y_{c_i})=(x_{c_{i-1}},y_{c_{i-1}})$.

The appropriate bits of the x-coordinate $x_c$ of the hash point $(x_{c_u},y_{c_u})$ and the appropriate bits of the x-coordinates $x_{Tc}$ of the hash point $(x_{Tc_u},\sqrt{\overline{\alpha}}y_{Tc_u})$ are concatenated together to form the hash, which is then appended to the message to be sent together with, if necessary, any additional information needed to help authenticate the message bit string at the receiving correspondent.

The Legendre Symbol is used to test whether an element of $F(p)$ has a square root or not, i.e., whether an element is quadratic residue or not. The Legendre Symbol and test are as follows. Given an element of a finite field $F(p)$, such as d, the Legendre symbol is defined as (d/p). In order to test whether d is quadratic residue or not, the Legendre symbol, (d/p), is defined so that:

$$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, the hash functions use the scalar multiplication $k_m(x_{Pu},y_{Pu})$. It should be noted that, in order to find a collision, there must be two message bits strings m and m' such that their integer values $k_m$ and $k_{m'}$ will lead to $k_m k(x_B,y_B)=k_{m'}k(x_B,y_B)$. This collision implies that integers can be found such that $k_m k - k_{m'} k = l*\#EC$, where #EC is the order of the group (EC,+). This is equivalent to solving the elliptic curve discrete logarithm problem. This also applies to finding a collision for the points on the twist of an elliptic curve, $k_m k(x_{TB},\sqrt{\overline{\alpha}}y_{TB})=k_{m'}k(x_{TB},\sqrt{\overline{\alpha}}y_{TB})$.

Thus, the security of the hash functions using elliptic curve cryptography relies upon the security of the underlying elliptic curve cryptography. The security of elliptic curve cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows. Given an elliptic curve defined over F that needs N-bits for the representation of its elements, an elliptic curve point $(x_P,y_P) \in EC$, defined in affine coordinates, and a point $(x_Q,y_Q) \in EC$, defined in affine coordinates, determine the integer $k, 0 \leq k \leq \#F$, such that $(x_Q,y_Q)=k(x_P,y_P)$, provided that such an integer exists. In the below, it is assumed that such an integer exists.

The most well known attack used against the ECDLP is the Pollard ρ-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known hard mathematical problem, it is expected that the security of the above hash functions is greater than prior art ciphers that are not based on such a mathematically hard problem.

It is to be understood that the present invention is not limited to the embodiments described above, but encompasses any and all embodiments within the scope of the following claims.

We claim:

1. A method of generating hash functions using elliptic curves for cryptography, comprising the steps of:
   (a) specifying a set of coefficients a,b∈F, wherein F represents a finite field, wherein elements of F are represented by (N+1) bits, and wherein N is a selected natural number;
   (b) establishing an elliptic curve EC that satisfies $y^2=x^3+ax+b$, wherein x and y are Cartesian coordinates;
   (c) establishing a twist TEC of the elliptic curve EC that satisfies $\bar{\alpha}y^2=x^3+ax+b$, wherein $\bar{\alpha}$ is non-quadratic residue of the finite field F;
   (d) specifying a base point on the elliptic curve $(x_B,y_B) \in EC$ and a base point on the twist of the elliptic curve $(x_{TB}, \sqrt{\bar{\alpha}}y_{TB}) \in TEC$;
   (e) establishing the set of coefficients, the base point on the elliptic curve and the base point on the twist of the elliptic curve as public information;
   (d) selecting a pair of random numbers $k_1, k_2$, wherein the pair of random numbers are established as private information and the pair of random numbers are scalars;
   (e) computing a multiplication of the random number $k_1$ with the base point $(x_B, y_B)$ to produce the scalar multiplication $(x_{Pu}, y_{Pu})=k_1(x_B, y_B)$;
   (f) computing a multiplication of the random number $k_2$ with the base point $(x_{TB}, \sqrt{\bar{\alpha}}y_{TB})$ to produce the scalar multiplication $(x_{TPu}, \sqrt{\bar{\alpha}}y_{TPu})=k_2(x_{TB}, \sqrt{\bar{\alpha}}y_{TB})$;
   (g) establishing $(x_{Pu}, y_{Pu})$ and $(x_{TPu}, \sqrt{\bar{\alpha}}y_{TPu})$ as public information;
   (h) processing a message bit string to produce a bit string that is a multiple of N bits;
   (i) computing an initial hash point $(x_{c_1}, y_{c_1})$ on the elliptic curve;
   (j) computing an initial hash point $(x_{Tc_1}, \sqrt{\bar{\alpha}}y_{Tc_1})$ on the twist of the elliptic curve;
   (k) establishing an integer i representing an $i^{th}$ message data block and setting i=2;
   (l) embedding a message N bit string of an $i^{th}$ block into the x-coordinate of the elliptic message point $(x_{m_i}, \sqrt{\alpha_{m_i}}y_{m_i})$ using non-iterative embedding;
   (m) computing the set of hash points as $(x_{c_i}, y_{c_i})=(x_{m_i}, y_{m_i})+(x_{c_{i-1}}, y_{c_{i-1}})$ and $(x_{Tc_i}, \sqrt{\bar{\alpha}}y_{Tc_i})=(x_{Tc_{i-1}}, \sqrt{\bar{\alpha}}y_{Tc_{i-1}})$ if $\alpha_{m_i}=1$, and otherwise computing the set of hash points as $(x_{Tc_i}, \sqrt{\bar{\alpha}}y_{Tc_i})=(x_{m_i}, \sqrt{\bar{\alpha}}y_{m_i})+(x_{Tc_{i-1}}, \sqrt{\bar{\alpha}}y_{Tc_{i-1}})$ and $(x_{c_i}, y_{c_i})=(x_{c_{i-1}}, y_{c_{i-1}})$;
   (n) repeating steps (l) and (m) until the message data blocks are processed and incrementing i at each said step; and
   (o) concatenating bits of the x-coordinate $x_c$, and the sign bit of the y-coordinate $y_c$ of a hash point $(x_{c_u}, y_{c_u})$, along with the bits of the x-coordinates $x_{Tc}$ and the sign bit of the y-coordinate $y_{Tc}$ of a hash point $(x_{Tc_u}, \sqrt{\bar{\alpha}}y_{Tc_u})$ to form a hash bit string.

2. The method of generating hash functions using elliptic curves for cryptography as recited in claim 1, wherein step (i) includes multiplication of a scalar integer value $k_{m_0}$ of the N bit string of an initial block of a message with the point $(x_{Pu}, y_{Pu})$, such that $(x_{c_1}, y_{c_1})=k_{m_0}(x_{Pu}, y_{Pu})$.

3. The method of generating hash functions using elliptic curves for cryptography as recited in claim 2, wherein step (j) includes multiplication of a scalar integer value $k_{m_1}$ of the N bit string of the next block of the message with the point $(x_{TPu}, \sqrt{\bar{\alpha}}y_{TPu})$ such that $(x_{Tc_1}, \sqrt{\bar{\alpha}}y_{Tc_1})=k_{m_1}(x_{TPu}, \sqrt{\bar{\alpha}}y_{TPu})$.

4. The method of generating hash functions using elliptic curves for cryptography as recited in claim 1, wherein the step of non-iterative embedding comprises the steps of:
   dividing the message bit string into N bit strings and establishing $m_i$ as the $i^{th}$ block;
   assigning the value of the bit string of $m_i$ to $x_{m_i}$;
   substituting the values of $x_{m_i}$ and computing a value $t_{m_i}$ as $t_{m_i}=x_{m_i}^3+ax_{m_i}+b$, wherein if $t_{m_i}$ is quadratic residue such that $y_{m_i}=\sqrt{t_{m_i}}$ then a temporary message point $(x_{m_i}, y_{m_i})$ is established, and if $t_{m_i}$ is non-quadratic residue such that $$y_{m_i} = \sqrt{\frac{t_{m_i}}{\bar{\alpha}}}$$

then the temporary message point is established as $(x_{m_i}, \sqrt{\bar{\alpha}}y_{m_i})$; and
   establishing a message point $(x_{m_i}, \sqrt{\alpha_{m_i}}y_{m_i})$, wherein the message point is on the elliptic curve if $\alpha_{m_i}=1$, and the message point is on the twist of the elliptic curve if $\alpha_{m_i}=\bar{\alpha}$.

5. A method of generating hash functions using elliptic curves for cryptography, comprising the steps of:
   (a) specifying a set of coefficients a,b∈F, wherein F represents a finite field, wherein elements of F are represented by (N+1) bits, and wherein N is a selected natural number;
   (b) establishing an elliptic curve EC that satisfies $y^2=x^3+ax+b$, wherein x and y are Cartesian coordinates;
   (c) establishing a twist TEC of the elliptic curve EC that satisfies $\bar{\alpha}y^2=+x^3+ax+b$, wherein $\bar{\alpha}$ is non-quadratic residue of the finite field F;
   (d) specifying a base point on the elliptic curve $(X_B, y_B) \in EC$ and a base point on the twist of the elliptic curve $(x_{TB}, \sqrt{\bar{\alpha}}y_{TB}) \in TEC$;
   (e) establishing, the set of coefficients, the base point on the elliptic curve and the base point on the twist of the elliptic curve as public information;
   (d) selecting a pair of random numbers $k_1, k_2$, wherein the pair of random numbers are established as private information and the pair of random numbers are scalars;
   (e) computing a multiplication of the random number $k_1$ with the base point $(x_B, y_B)$ to produce the scalar multiplication $(x_{Pu}, y_{Pu})=k_1(x_B, y_B)$;
   (f) computing a multiplication of the random number $k_2$ with the base point $(x_{TB}, \sqrt{\bar{\alpha}}y_{TB})$ to produce the scalar multiplication $(x_{TPu}, \sqrt{\bar{\alpha}}y_{TPu})=k_2(x_{TB}, \sqrt{\bar{\alpha}}y_{TB})$;
   (g) establishing $(x_{Pu}, y_{Pu})$ and $(x_{TPu}, \sqrt{\bar{\alpha}}y_{TPu})$ as public information;
   (h) processing a message bit string to produce a bit string that is a multiple of N bits, wherein N is a selected natural number;
   (i) computing a temporary initial hash point $(x_{S_1}, y_{S_1})$ on the elliptic curve;
   (j) computing a temporary initial hash point $(x_{TS_1}, \sqrt{\bar{\alpha}}y_{TS_1})$ on the twist of the elliptic curve;
   (k) initializing a set of initial hash points $(x_{c_1}, y_{c_1})$ and $(x_{Tc_1}, \sqrt{\bar{\alpha}}y_{Tc_1})$ such that $(x_{c_1}, y_{c_1})=(x_{S_1}, y_{S_1})$ and $(x_{Tc_1}, \sqrt{\bar{\alpha}}y_{Tc_1})=(x_{TS_1}, \sqrt{\bar{\alpha}}y_{TS_1})$;
   (l) establishing an integer i representing an $i^{th}$ message data block and setting i=2;
   (m) embedding a message N bit string of an $i^{th}$ block into the x-coordinate of the elliptic message point $(x_{m_i}, \sqrt{\alpha_{m_i}}y_{m_i})$ using non-iterative embedding;
   (n) doubling the points $(x_{S_i}, y_{S_i})$ and $(x_{TS_i}, y_{TS_i})$ such that $(x_{S_i}, y_{S_i})=2(x_{S_{i-1}}, y_{S_{i-1}})$ and $(x_{TS_i}, y_{TS_i})=2(x_{TS_{i-1}}, \sqrt{\bar{\alpha}}y_{TS_{i-1}})$;

(o) computing the set of hash points as $(x_{c_i},y_{c_i})=(x_{m_i},y_{m_i})+(x_{m_{i-1}},y_{m_{i-1}})+(x_{S_i},y_{S_i})$ and $(x_{Tc_i},\sqrt{\overline{\alpha}}y_{Tc_i})=(x_{Tc_{i-1}},\sqrt{\overline{\alpha}}y_{Tc_{i-1}})$ if $\alpha_{m_i}=1$, and otherwise computing the set of hash points as $(x_{Tc_i},\sqrt{\overline{\alpha}}y_{Tc_i})=(x_{m_i},\sqrt{\overline{\alpha}}y_{m_i})+(x_{m_{i-1}},\sqrt{\overline{\alpha}}y_{m_{i-1}})+(x_{TS_i},\sqrt{\overline{\alpha}}y_{TS_i})$ and $(x_{c_i},y_{c_i})=(x_{c_{i-1}},y_{c_{i-1}})$;

(p) repeating steps (m) through (o) until the message data blocks are processed and incrementing i at each said step; and (q) concatenating bits of the x-coordinate $x_c$ and the sign bit of the y-coordinate $y_c$ of a hash point $(x_{c_u},y_{c_u})$, along with the bits of the x-coordinates $x_{Tc}$ and the sign bit of the y-coordinate $y_{Tc}$ of a hash point $(x_{Tc_u},\sqrt{\overline{\alpha}}y_{Tc_u})$ to form a hash bit string.

6. The method of generating hash functions using elliptic curves for cryptography as recited in claim 5, wherein step (i) includes multiplication of a scalar integer value $k_{m_0}$ of the N bit string of an initial block of a message with the point $(x_{Pu},y_{Pu})$, such that $(x_{S_1},y_{S_1})=k_{m_0}(x_{Pu},y_{Pu})$.

7. The method of generating hash functions using elliptic curves for cryptography as recited in claim 6, wherein step (j) includes multiplication of a scalar integer value $k_{m_1}$ of the N bit string of the next block of the message with the point $(x_{TPu},\sqrt{\overline{\alpha}}y_{TPu})$, such that $(x_{TS_1},\sqrt{\overline{\alpha}}y_{TS_1})=k_{m_1}(x_{TPu},\sqrt{\overline{\alpha}}y_{TPu})$.

8. The method of generating hash functions using elliptic curves for cryptography as recited in claim 5, wherein the step of non-iterative embedding comprises the steps of:

dividing the message bit string into N bit strings and establishing $m_i$ as the $i^{th}$ block;

assigning the value of the bit string of $m_i$ to $x_{m_i}$;

substituting the values of $x_{m_i}$ and computing a value $t_{m_i}$ as $t_{m_i}=x_{m_i}^3+ax_{m_i}+b$, wherein if $t_{m_i}$ is quadratic residue such that $y_{m_i}=\sqrt{t_{m_i}}$ then a temporary message point $(x_{m_i},y_{m_i})$ is established, and if $t_{m_i}$ is non-quadratic residue such that $$y_{m_i}=\sqrt{\frac{t_{m_i}}{\overline{\alpha}}}$$

then the temporary message point is established as $(x_{m_i},\sqrt{\overline{\alpha}}y_{m_i})$; and establishing a message point $(x_{m_i},\sqrt{\alpha_{m_i}}y_{m_i})$, wherein the message point is on the elliptic curve if $\alpha_{m_i}=1$, and the message point is on the twist of the elliptic curve if $\alpha_{m_i}=\overline{\alpha}$.

9. A method of generating hash functions using elliptic curves for cryptography, comprising the steps of:

(a) specifying a set of coefficients a,b∈F and selecting an initial vector $S_{m_1}$, wherein F represents a finite field, wherein elements of F are represented by (N+1) bits, and wherein N is a selected natural number;

(b) establishing an elliptic curve EC that satisfies $y^2=x^3+ax+b$, wherein x and y are Cartesian coordinates;

(c) establishing a twist TEC of the elliptic curve EC that satisfies $\overline{\alpha}y^2=x^3+ax+b$, wherein $\overline{\alpha}$ is non-quadratic residue of the finite field F;

(d) specifying a base point on the elliptic curve $(x_B,y_B)\in EC$ and a base point on the twist of the elliptic curve $(x_{TB},\sqrt{\overline{\alpha}}y_{TB})\in TEC$;

(e) establishing the set of coefficients, the base point on the elliptic curve, the base point on the twist of the elliptic curve, and the initial vector $S_{m_1}$ as public information;

(d) selecting a pair of random numbers $k_1,k_2$, wherein the pair of random numbers are established as private information and the pair of random numbers are scalars;

(e) computing a multiplication of the random number $k_1$ with the base point $(x_B,y_B)$ to produce the scalar multiplication $(x_{Pu},y_{Pu})=k_1(x_B,y_B)$;

(f) computing a multiplication of the random number $k_2$ with the base point $(x_{TB},\sqrt{\overline{\alpha}}y_{TB})$ to produce the scalar multiplication $(x_{TPu},\sqrt{\overline{\alpha}}y_{TPu})=k_2(x_{TB},\sqrt{\overline{\alpha}}y_{TB})$;

(g) establishing $(x_{Pu},y_{Pu})$ and $(x_{TPu},\sqrt{\overline{\alpha}}y_{TPu})$ as public information;

(h) processing a message bit string to produce a bit string that is a multiple of N bits, wherein N is a selected natural number;

(i) computing a temporary initial hash point $(x_{S_1},y_{S_1})$ on the elliptic curve;

(j) computing a temporary initial hash point $(x_{TS_1},\sqrt{\overline{\alpha}}y_{TS_1})$ on the twist of the elliptic curve;

(k) initializing a set of initial hash points $(x_{c_1},y_{c_1})$ and $(x_{Tc_1},\sqrt{\overline{\alpha}}y_{Tc_1})$ such that $(x_{c_1},y_{c_1})=(x_{S_1},y_{S_1})$ and $(x_{Tc_1},\sqrt{\overline{\alpha}}y_{Tc_1})=(x_{TS_1},\sqrt{\overline{\alpha}}y_{TS_1})$;

(l) establishing an integer i representing an $i^{th}$ message data block and setting i=2;

(m) computing an N-bit string $S_{m_i}$ such that $S_{m_i}'=S_{m_i}\oplus S_{m_{i-1}}$, wherein $S_{m_i}'$ is the N-bit string of the $i^{th}$ block of the message, and embedding a message N bit string of an $i^{th}$ block into the x-coordinate of the elliptic message point $(x_{m_i},\sqrt{\alpha_{m_i}}y_{m_i})$ using non-iterative embedding;

(n) doubling the points $(x_{S_i},y_{S_i})$ and $(x_{TS_i},y_{TS_i})$, such that $(x_{S_i},y_{S_i})=2(x_{S_{i-1}},y_{S_{i-1}})$ and $(x_{TS_i},y_{TS_i})=2(x_{TS_{i-1}},\sqrt{\overline{\alpha}}y_{TS_{i-1}})$;

(o) computing the set of hash points as $(x_{c_i},y_{c_i})=(x_{m_i},y_{m_i})+(x_{m_{i-1}},y_{m_{i-1}})+(x_{S_i},y_{S_i})$ and $(x_{Tc_i},\sqrt{\overline{\alpha}}y_{Tc_i})=(x_{Tc_{i-1}},\sqrt{\overline{\alpha}}y_{Tc_{i-1}})$ if $\alpha_{m_i}=1$, and otherwise computing the set of hash points as $(x_{Tc_i},\sqrt{\overline{\alpha}}y_{Tc_i})=(x_{m_i},\sqrt{\overline{\alpha}}y_{m_i})+(x_{m_{i-1}},\sqrt{\overline{\alpha}}y_{m_{i-1}})+(x_{TS_i},\sqrt{\overline{\alpha}}y_{TS_i})$ and $(x_{c_i},y_{c_{i-1}},y_{c_{i-1}})$;

(p) repeating steps (m) through (o) until the message data blocks are processed and incrementing i at each said step; and (q) concatenating bits of the x-coordinate $x_c$ and the sign bit of the y-coordinate $y_c$ of a hash point $(x_{c_u},x_{c_u})$ along with the bits of the x-coordinates $x_{Tc}$ and the sign bit of the y-coordinate $y_{Tc}$ of a hash point $(x_{Tc_u},\sqrt{\overline{\alpha}}y_{Tc_u})$ to form a hash bit string.

10. The method of generating hash functions using elliptic curves for cryptography as recited in claim 9, wherein step (i) includes multiplication of a scalar integer value $k_{m_0}$ of the N bit string of an initial block of a message with the point $(x_{Pu},y_{Pu})$, such that $(x_{S_1},y_{S_1})=k_{m_q}(x_{Pu},y_{Pu})$.

11. The method of generating hash functions using elliptic curves for cryptography as recited in claim 10, wherein step (j) includes multiplication of a scalar integer value $k_{m_1}$ of the N bit string of the next block of the message with the point $(x_{TPu},\sqrt{\overline{\alpha}}y_{TPu})$, such that $(x_{TS_1},\sqrt{\overline{\alpha}}y_{TS_1})=k_{m_1}(x_{TPu},\sqrt{\overline{\alpha}}y_{TPu})$.

12. The method of generating hash functions using elliptic curves for cryptography as recited in claim 9, wherein the step of non-iterative embedding comprises the steps of:

dividing the message bit string into N bit strings and establishing $m_i$ as the $i^{th}$ block;

assigning the value of the bit string of $m_i$ to $x_{m_i}$;

substituting the values of $x_{m_i}$ and computing a value $t_{m_i}$ as $t_{m_i}=x_{m_1}^3+ax_{m_1}+b$, wherein if $t_{m_i}$ is quadratic residue such that $y_{m_i}=\sqrt{t_{m_i}}$ then a temporary message point $(x_{m_i},y_{m_i})$ is established, and if $t_{m_i}$ is non-quadratic residue such that $$y_{m_i}=\sqrt{\frac{t_{m_i}}{\overline{\alpha}}}$$

then the temporary message point is established as $(x_{m_i},\sqrt{\overline{\alpha}}y_{m_i})$; and establishing a message point $(x_{m_i},\sqrt{\alpha_{m_i}}y_{m_i})$, wherein the message point is on the elliptic curve if $\alpha_{m_i}=1$, and the message point is on the twist of the elliptic curve if $\alpha_{m_i}=\overline{\alpha}$.

* * * * *